Sept. 25, 1923.

K. W. OSTER

BIRD CAGE

Filed Jan. 8, 1923

Inventor
K. W. Oster

By Lacy & Lacy, Attorneys

Sept. 25, 1923. 1,468,730
K. W. OSTER
BIRD CAGE
Filed Jan. 8, 1923 3 Sheets-Sheet 2
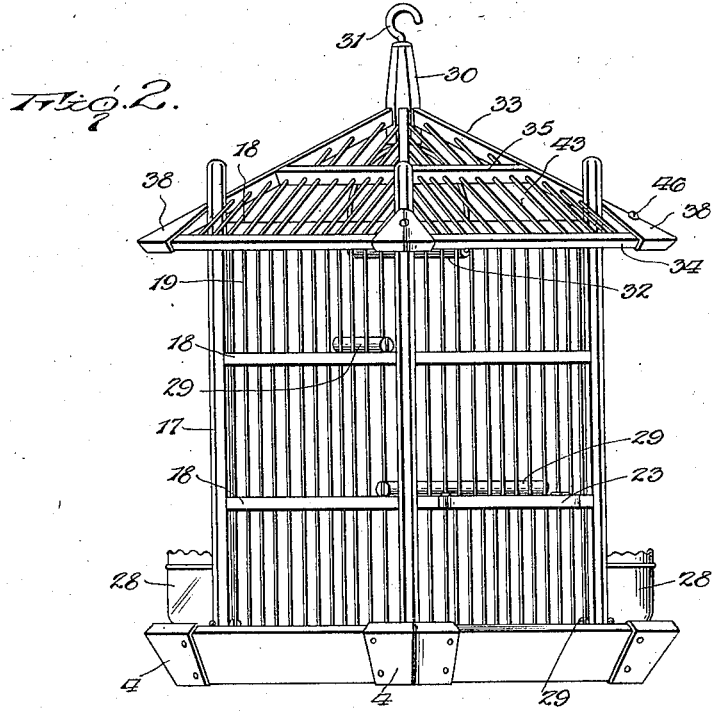
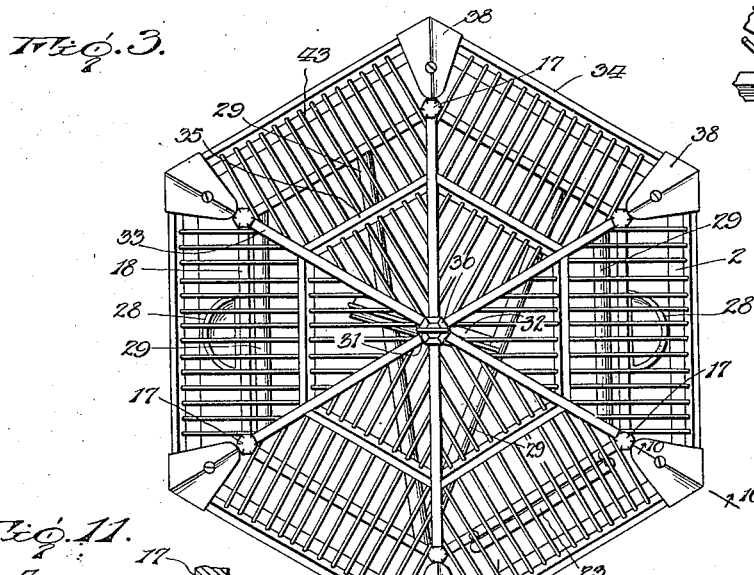
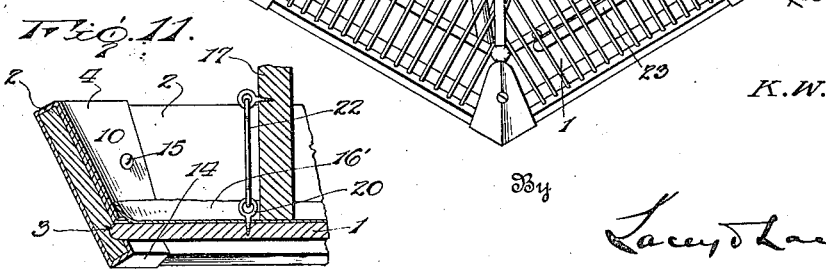

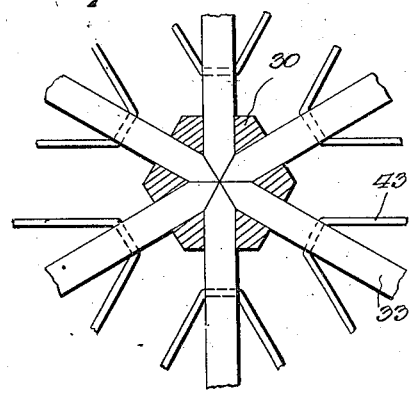
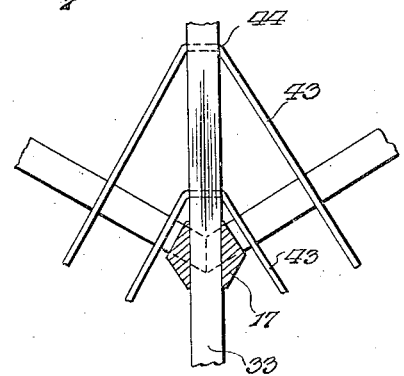
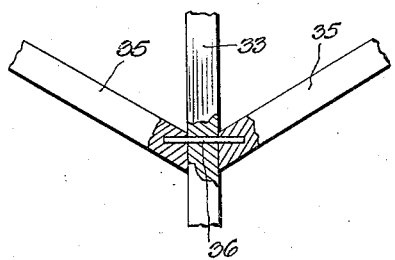
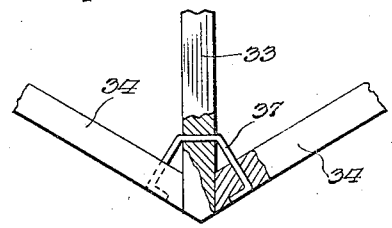
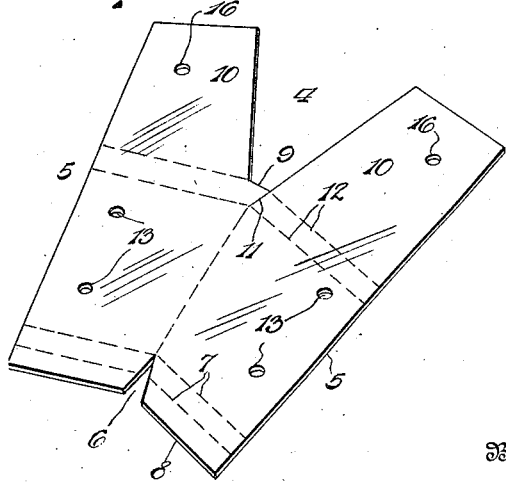
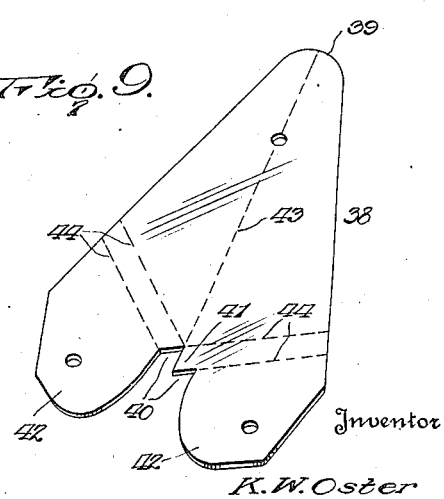

Patented Sept. 25, 1923.

1,468,730

UNITED STATES PATENT OFFICE.

KARL W. OSTER, OF PORTLAND, OREGON.

BIRD CAGE.

Application filed January 8, 1923. Serial No. 611,429.

*To all whom it may concern:*

Be it known that I, KARL W. OSTER, a citizen of the United States, residing at Portland, in the county of Multnomah and State of Oregon, have invented certain new and useful Improvements in Bird Cages, of which the following is a specification.

This invention relates to bird cages and has for its object to provide a bird cage which will be attractive in appearance, easily cleaned, strong and durable and capable of manufacture at a low cost. The invention is illustrated in the accompanying drawings and will be hereinafter fully set forth.

In the drawings—

Fig. 2 is a side elevation of the same;

Fig. 3 is a top plan view thereof;

Fig. 4 is a view, partly in section and partly in plan, showing the connection between the rafters and the crown piece;

Fig. 5 is a detail view, partly in plan and partly in section, showing the connection of the rafters with the corner post;

Fig. 6 is a detail view showing the manner of connecting the cross bars with the rafters;

Fig. 7 is a detail view showing the manner of connecting the eaves with the ends of the rafters;

Fig. 8 is a perspective view of the blank from which the coupling for the side rails at the bottom of the cage is formed;

Fig. 9 is a similar view of the blank for producing the coupling employed in connection with the rafters and the eaves;

Fig. 10 is an enlarged detail section on the line 10—10 of Fig. 3, and

Fig. 11 is an enlarged detail section on the line 11—11 of Fig. 1.

Figure 1:
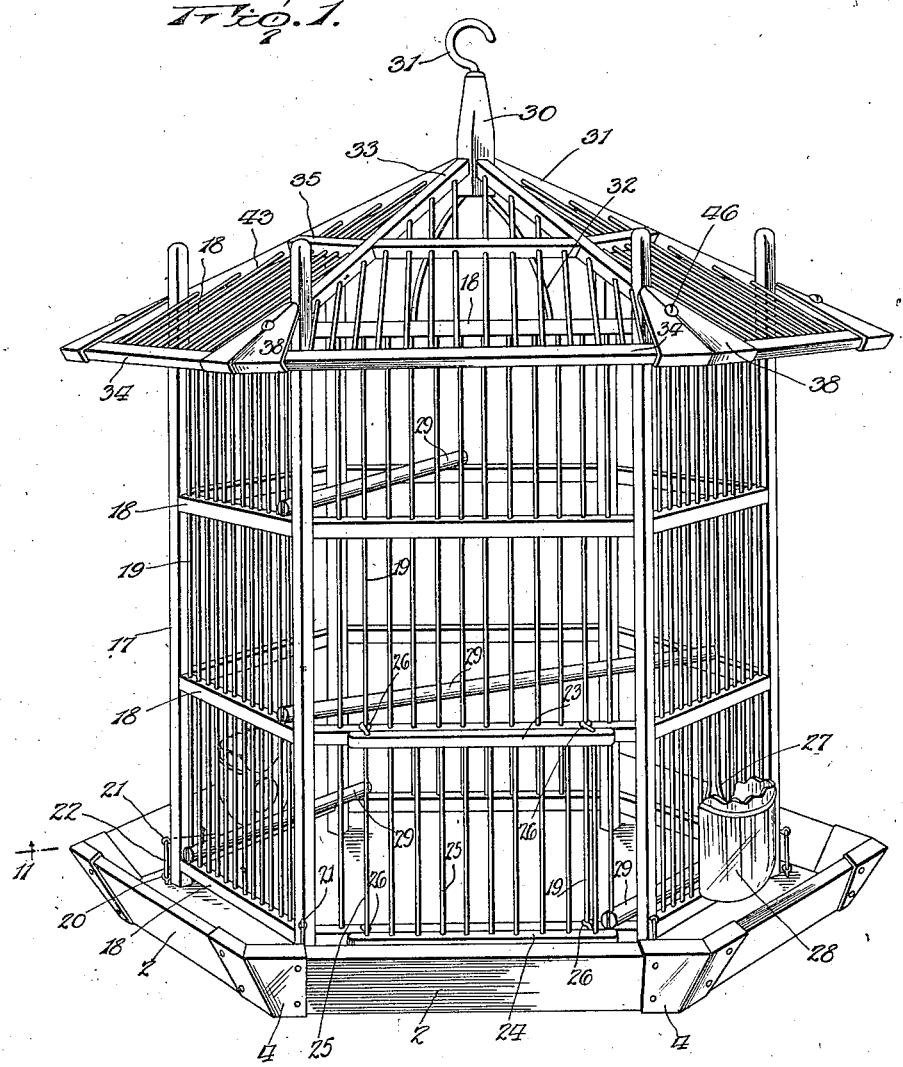
Figure 1 is a perspective view of a bird cage constructed in accordance with my present invention.

The bottom or floor 1 of the cage is preferably constructed of wood but obviously may be constructed of any preferred material. This floor is hexagonal in outline and the entire cage is of similar form as it is thereby given an attractive appearance and is roomy and at the same time may be more cheaply constructed than cages of circular form. The floor 1 is supported by side rails 2 which are provided near their lower edges with grooves, as indicated at 3, to snugly receive the edge of the floor, and the said rails are flared upwardly and outwardly, as clearly shown in Figs. 1, 2 and 11.

The groove 3 is located above the lower edge of the rail so that the floor may be supported above a table or other fixed support and, if the cage be suspended in an elevated position, the lower projecting edges of the several side rails will present a more attractive appearance than if the floor were flush with the lower edges of the rails or secured beneath the same, and it may be here noted that the larger parts of my cage are all constructed of wood which may be given any desired finish and may be hard woods of such quality as will resist the encroachment of vermin and insects. The meeting edges of adjacent side rails 2 are suitably beveled so that they may abut in hexagonal relation, and around the joints thus formed I secure coupling plates 4 which are of metal and impart an ornamental appearance to the cage. These coupling plates are constructed from the blank shown in Fig. 8, in which there is shown a metallic plate having its sides 5 converging toward one end and provided with a relatively small V-shaped notch 6 in said end, the edges of the plate at the opposite sides of the said notch being disposed at a right angle to the converging side edges 5. The blank may be scored, as indicated at 7, upon lines parallel to the end edges 8 to facilitate the folding of the same about the under edges of the side rails 2 of the cage and at the opposite end of the blank, a relatively large V-shaped notch is provided having a blunt base 9. The web or portion of the plate presenting the blunt base 9 of this larger V-shaped notch is separated from one side wing 10 of the blank by an incision 11 and from the ends of said incision, scored lines 12 extend at right angles to the side edges 15, as shown. In applying the described blank to the corners of the cage, the main body portion of the blank is disposed against the outer sides of meeting rails 2, as shown in Figs. 1 and 2, and is secured to the same by headed nails or screws inserted through openings 13 in the blank near the side edges of the same. The lower end portions of the blank are then bent upon the lines 7 so as to extend under the lower edges of the rails and up against the inner sides thereof, as shown at 14 in Fig. 11, the end edges 8 abutting against the under side of the floor 1. The opposite ends of the blank are then folded over the upper edges of the rails 2 and down upon the inner sides of the same about the lines 12, the triangular tongue defined by the edge 9 and the slit or incision 11 being overlapped by the adjacent inner edge of the mating tongue 10. These tongues are secured to the rails by headed nails or screws, indicated at 15, inserted through openings 16 in the tongues 10, as will be readily understood. A floor covering 16' is provided and this floor covering may be of any desired material, I preferring to use paper of some ornamental design. The edges of the floor covering are turned upwardly to a slight extent so that they will rest against the inner surfaces of the side rails 2 and this covering serves to catch all refuse which ordinarily collects within a cage and will permit all of the same to be withdrawn at one time, it being understood that the floor covering will be of some cheap material which may be renewed from time to time at a very trifling expense.

The sides of the cage consist of posts 17, cross bars or beams 18 secured to and extending between the posts at intervals in the height of the same, and resilient wires 19 extending through and secured in the several cross bars, the wires being preferably spring-tempered brass and arranged parallel and equi-distant. The lowest cross bar 8 is preferably spaced a slight distance from the lower extremities of the posts so that an opening will be provided between the cross bar and the floor of the cage, this opening, however, being too small to permit escape of the bird. Screw eyes 20 are secured in the bottom or floor 1 adjacent the angles defined by the side rails 2 so that the said screw eyes serve as guides for the location of the posts 17 when the body of the cage is being placed in position upon the floor thereof. A screw eye 21 is also provided upon each post, and a hook 22 is carried by each screw eye 21. After the body of the cage has been brought into proper position upon the floor or base 1, the hooks 22 are engaged in the screw eyes 20 so that the body of the cage will be firmly held in place. It will be understood also that the screw eyes and the posts prevent accidental removal of the floor covering inasmuch as the posts rest directly on the said floor covering and the heads of the screw eyes will prevent upward movement of the floor covering after the covering has been pushed down over the screw eyes. The force of strong breezes which might otherwise carry away the floor covering is thus effectually counteracted so that the floor or bottom of the cage is maintained in a clean condition at all times. The wires in the side of the cage, being resilient, will maintain their straight form inasmuch as after an object has been inserted between the wires and then withdrawn, the wires will resume their initial outline. It is also to be noted that the floor or base of my improved cage extends an appreciable distance beyond the sides of the cage and the rails not only flare upwardly and outwardly but are spaced from the sides of the cage so that any bird seed or other matter which might fly through the sides of the cage will be caught by the rails and collect in the space between the rails and the body of the cage. This feature of my improved cage avoids the necessity of employing screens or covers which are frequently indispensable in other forms of cages and which are objectionable inasmuch as they make it difficult to observe the bird, and also interfere with the vision of the bird and thereby exert an influence upon his disposition which is detrimental to his singing and his general health.

The door of my improved cage consists of an upper bar 23, a lower bar 24 and parallel vertical wires 25 fitted in and extending between the said bars. The end wires 25 are provided at their extremities with laterally projecting loops or eyes 26 which slidably engage wires 19 of the body of the cage, and it is to be particularly noted, as shown most clearly at the right in Fig. 1, that the vertically alined eyes 26 both engage the same wire 19. The door is thus held close to and parallel with the sides of the cage at all times and in this respect my cage differs noticeably from all other bird cages known to me.

Some of the wires 19 are bowed in vertical planes, as indicated at 27, to be engaged by and support the feed cups 28 in the usual manner and any desired number of these feed cups may, of course, be used as may be preferred.

As shown most clearly in Fig. 1, each side of the cage includes three cross bars 18 and just above each series of the cross bars, I provide a perch 29, as shown, there being two perches upon the lowest cross bars to facilitate access of the birds to the feed cups. These perches are all different lengths and are disposed at different angles across the interior of the cage as will be best understood upon reference to Fig. 3.

The top of the cage includes a crown piece 30 which is equipped at its upper end with a suspension hook 31 and to the lower end of which a swinging perch 32 may be attached in any preferred or desired manner. Rafters 33 are secured to the crown piece 30 and radiate from the crown piece to extend to and through the several posts 7, the upper ends of the rafters being fitted in sockets in the crown piece and tapered so as to meet in the center and on the vertical axis of the crown piece, as shown most clearly in Fig. 4. The posts 7 are provided near their upper ends with obliquely disposed openings through which the rafters extend, as shown most clearly in Fig. 5, and the outer ends of the rafters are fitted between adjacent eaves 34, the ends of the eaves being beveled, as will be readily understood so as to fit close against the sides of the rafters. Beams 35 are disposed between the rafters and are secured to the same at points approximately midway the ends of the same. The ends of these beams are beveled to fit close against the sides of the rafters and conform to the hexagonal form of the cage and each beam is constructed with a socket in its end to receive a dowel pin 36 inserted through the rafter, as shown clearly in Fig. 6. The eaves are connected to the ends of the rafters by wires 37 which are extended through the rafters near the ends thereof and at the inner sides of the eaves and then diverge from the sides of the rafters to extend through the eaves at right angles to the length thereof, the extremities of these connecting wires being bent against the outer sides of the eaves, as clearly shown in Fig. 7. To cover the connecting wires 37 and reinforce the outer ends of the rafters and the meeting eaves as well as to impart an ornamental appearance to the cage, I employ the trimming plates 38 which are formed from the blank shown in Fig. 9. This blank is a substantially triangular sheet metal plate having its apex given an arcuate form, as shown at 39, and having its base cut to present the central notches 40 separated by a triangular tongue 41, and attaching tabs 42 projecting from the base of the triangle at the sides of the notches 40. The blank may be scored longitudinally upon its medial line, as indicated at 43, and from the ends of the tongue 41, scoring lines 44 may extend at right angles to the side edges of the blank. In applying the blank to the cage, the body of the same is placed upon the rafter with the arcuate end 39 thereof abutting a post 17 and the tongues 42 extending beyond the eaves 34. The blank is folded slightly along the line 43 so that its side portions will fit closely upon the upper surfaces of the adjacent eaves and the end portions of the blank are then folded or bent about the lines 44 so that the tongues 42 will be brought against the under sides of the rafters and the eaves. Headed nails or screws 36 are inserted through openings provided therefor in the main body of the blank and in the tongues 42 so as to secure the blank to the rafters, as will be readily understood. Wires 43 are provided in each section of the roof or top and the wires within each section are parallel. The several wires are bent medially into approximately V-shape and their side portions are arranged at right angles to the respective eaves and beams, the ends of the wires being embedded in the eaves and the intermediate portions of the sides thereof being inserted through the respective beams, while the apexes of the Vs are fitted through the rafters, as shown at 44 in Fig. 5. I thus provide a very strong top which is at the same time ornamental and inexpensive. When the body of the cage is in position upon the floor or base of the same, the cage may be suspended upon a ring or hook without any fear of its collapsing or of the bottom or floor separating from the body. The rafters which constitute the main sustaining portions of the top pass entirely through the side posts and are firmly embedded in the crown piece so that the body of the cage cannot drop from the roof or top, and in constructing the cage, I employ glue in all the joints so that the several members will be very firmly united. When the body of the cage is placed in position upon the floor or base and the latches or hooks 22 engage in the eyes 20, the base or floor will be so firmly attached to the body that it cannot become accidentally detached therefrom and while I prefer to employ a screw eye and hook upon each post, the parts will be firmly connected by the use of hooks and eyes upon the alternating posts only.

From the foregoing description, taken in connection with the accompanying drawings, it will be seen that I have provided a very strong and durable cage which may be rapidly produced at a low cost and which will be very attractive in appearance and will provide ample room for free movement of the bird. The construction facilitates cleaning of the cage and it will always have a sightly appearance inasmuch as the door connot become awry and the side rails are spaced from the sides of the body and flared upwardly and outwardly to such an extent that seeds and other matter which ordinarily are permitted to escape over the sides of the cage are caught and collected on the floor.

Having thus described the invention, what is claimed as new is:

1. In a bird cage, a floor, side rails provided in their inner sides with grooves receiving the edge of the floor, the said rails being flared upwardly and outwardly and having their lower edges disposed below the bottom of the floor, a body detachably secured upon the floor, and a floor covering extending over the floor and held to the same by the body and by the fastenings between the body and the floor.

2. In a bird cage, a floor, side rails supporting the floor and flaring upwardly and outwardly, and coupling plates secured to the outer sides of the rails at the meeting ends thereof and having tongues folded over the upper edges of the rails and against the inner sides thereof and under the lower edges of the rails and against the inner sides thereof.

3. In a bird cage, the combination of a base, a body resting on the base and including corner posts, a top including rafters passing through the corner posts near the upper ends of the same, beams secured to and extending between the rafters between the ends thereof, eaves extending between the ends of the rafters, and coupling plates secured upon the rafters and abutting the posts and having tongues at their ends folded around the eaves and secured to the under sides of the same and the rafters.

4. In a bird cage, a base, a body resting on the base and including corner posts, a top including rafters inserted through the posts near the upper ends thereof, beams fitted to and between the rafters intermediate the ends thereof, dowels inserted through the rafters and engaging the ends of the beams, eaves secured to and extending between the outer ends of the rafters, and parallel wires carried by the rafters, the beams and the eaves.

5. In a bird cage, a base, a body resting thereon, and a top carried by the body, said top including a crown piece, rafters having their inner ends embedded in the crown piece and their outer end portions connected to the body, eaves extending between the ends of the rafters, and connecting wires inserted through the rafters adjacent the outer ends thereof and having side portions passing transversely through the eaves with their extremities bearing against the outer sides of the eaves.

6. In a bird cage, a base, a body resting on the base, and a top consisting of rafters secured to the upper end of the body, beams, and eaves secured to and extending between the rafters, and wires having their ends embedded in the eaves and their central portions passing through the rafters, the side portions of said wires being disposed at right angles to the eaves.

In testimony whereof I affix my signature.

KARL W. OSTER.